United States Patent [19]

Burger

[11] 4,288,255
[45] Sep. 8, 1981

[54] RINSING METHOD AND APPARATUS FOR CAR-WASHING INSTALLATION

[76] Inventor: Horst Burger, Gartenstr. 6d, 8901 Neusäss, Fed. Rep. of Germany

[21] Appl. No.: 95,423

[22] Filed: Nov. 19, 1979

Related U.S. Application Data

[63] Continuation-in-part of Ser. No. 63,170, Aug. 2, 1979, abandoned.

[30] Foreign Application Priority Data

Aug. 7, 1978 [DE] Fed. Rep. of Germany ....... 2834582

[51] Int. Cl.³ ................................................. B08B 7/00
[52] U.S. Cl. ........................................ 134/6; 15/97 B; 15/DIG. 2; 134/29; 134/32; 134/123
[58] Field of Search ...................... 134/29, 26, 36, 32, 134/6, 199, 123; 15/53 R, DIG. 2, 97 B, 316 R

[56] References Cited

U.S. PATENT DOCUMENTS

| | | | |
|---|---|---|---|
| 1,866,197 | 7/1932 | Cunningham | 134/123 |
| 2,236,445 | 3/1941 | Pfeiffer | 134/26 |
| 2,544,066 | 3/1951 | Chenault | 15/97 B |
| 3,160,903 | 12/1964 | Grass | 15/97 B |
| 3,196,888 | 7/1965 | Rousseau | 134/199 |
| 3,421,940 | 1/1969 | Wedell et al. | 134/29 |
| 3,457,109 | 7/1969 | Peist | 134/29 |
| 3,517,405 | 6/1970 | Hanna et al. | 15/97 B |
| 3,585,051 | 6/1971 | Johnson | 134/29 |
| 3,711,883 | 1/1973 | Ennis | 15/97 B |
| 3,862,460 | 1/1975 | Rockafellow | 15/97 B |
| 3,931,658 | 1/1976 | Evans | 15/97 B |
| 4,231,806 | 11/1980 | Henry | 134/34 |

Primary Examiner—S. Leon Bashore
Assistant Examiner—Michael Goldman
Attorney, Agent, or Firm—Karl F. Ross

[57] ABSTRACT

A car to be washed is moved longitudinally along a path through a washing station, a prerinsing station, a rinsing station and a drying station. At the washing station the car is scrubbed with hot, soapy water. In the prerinsing station the car is sprayed with water mixed with a surface-tension-increasing agent. In the rinsing station the car passes under a curtain down which flows a film of pure water. The curtain is formed of a multiplicity of parallel vertical filaments that conduct this rinse water with the surface-tension-increasing agent as a substantially continuous film over the vehicle.

13 Claims, 6 Drawing Figures

RINSING METHOD AND APPARATUS FOR CAR-WASHING INSTALLATION

CROSS-REFERENCE TO RELATED APPLICATION

This application is a continuation-in-part of my copending application Ser. No. 063,170 filed Aug. 2, 1979 (now abandoned).

FIELD OF THE INVENTION

The present invention relates to a car-washing installation and method of operating same. More particularly this invention concerns improvements in the rinsing and drying of a car in a car-washing installation.

BACKGROUND OF THE INVENTION

A standard installation for washing a car, by which is meant any vehicle or other large object normally cleaned in such an installation, normally has four separate stations spaced longitudinally apart on a longitudinally extending path along which the car is displaced during washing. The furthest upstream station sprays the car with soapy water and may even act on the car with brushes and the like to loosen dirt. Downstream of this station there is normally provided a prerinsing station which sprays the car with substantially clean water. Further downstream of this station there is normally provided a rinsing station which removes any remaining soap residue from the car. Finally, the furthest downstream station incorporates a dryer which may be provided with a heater for directing a blast of air at the rinsed car to dry same.

The last-mentioned drying station normally incorporates an extremely large blower, or several small blowers such as described in my earlier U.S. Pat. No. 3,787,986. In order to ensure adequate drying of the vehicle, it is normal to employ a blower or blowers having a total electricity consumption of at least 15 kilowatts. Thus the drying station not only costs a great deal due to the heavy-duty blower or blowers needed, but entails considerable operation expense due to the high power consumption. In addition the amount of noise produced at the drying station is also normally extremely high, far above OSHA standards, so that it is necessary to provide considerable soundproofing around the drying station. In fact it is know for building permits in otherwise quiet areas to be rejected for car-washing installations based mainly on this large noise factor.

OBJECTS OF THE INVENTION

It is therefore an object of the present invention to provide an improved car-washing installation.

Another object is the provision of such an installation wherein a substantially smaller capacity drying blower can be used, while drying the car at least as well as the prior-art installations.

Another object is to provide an improved rinsing method and installation for a car-washing installation.

SUMMARY OF THE INVENTION

These objects are attained according to the instant invention in a car-washing installation and method of the above-described general type, but wherein the prerinse water is mixed prior to use with a surface-tension-increasing agent. After prerinsing with this mixture, the car is rinsed with relatively clean water poured under substantially atmospheric pressure as a substantially continuous film or sheet onto the vehicle. Thus the rinse water is not sprayed at the vehicle, but instead is caused to flow gently over the vehicle as a film so that it runs off substantially without leaving drops behind.

According to a further feature of this invention the prerinse liquid is a weak aqueous alcohol solution, having between 0.2% and 0.4% by weight of alcohol. In this manner the surface of the vehicle being cleaned is rendered slightly hydrophobic or water-shedding, so that the subsequent running off effect is itself enhanced. The surface of a car so treated is extremely shiny and free of any deposits from the rinse and prerinse waters. The surface-tension-increasing agent in the prerinse liquid comprises by weight between 5% and 15% dialkyldimethylammoniumchloride with between twelve and sixteen carbon atoms, between 4% and 10% of a mixture of primary, secondary and tertiary amines with between six and twelve carbon atoms, between 8% and 20% solvent, between 2% and 5% defoaming oil, and between 1% and 5% scent. The rinse water subsequently flowed over the car is heated according to this invention to between 50° C. and 60° C. before it is caused to flow as a film onto the car.

In accordance with further features of this invention the rinse water is poured onto the car from a dispenser formed as a portal that can be moved longitudinally parallel to the displacement direction of the car through the installation. In accordance with this invention the rinse water is not poured onto the car until the middle of the car is underneath the dispenser, then the dispenser is moved rapidly forward at a speed faster than the advance speed of the car to the front of the car, and then slowly backwardly. Thus the film of rinse water and tension-increasing agent is effectively laid over the entire car from the middle out, so that it will normally drain off the car leaving practically no drops behind.

According to further features of this invention the rinsing-dispenser portal has a horizontal dispensing bar which may be vertically displaceable. A curtain hangs from the dispensing bar and is formed in accordance with this invention of a plurality of filaments having their upper ends secured to the bar and having freely hanging lower ends that engage the car as it passes thereunder. The bar may be formed in part as a brush, so that the water film is applied by this brush to the filaments and runs down to the car passing thereunder. Thus there is no free fall for the second rinse water at all, so that it will form a substantially continuous sheet or film on the car being rinsed.

The system according to the instant invention can use a very small drying blower, and can often be operated with no special drying blower at all. The use of the above-described curtain prevents any stray droplets from the washing area from landing on the vehicle after it has been rinsed, so that the various washing, prerinsing, rinsing and drying stations can be spaced very closely together for an extremely compact installation. Indeed it is possible to make the installation so very compact that the front end of the vehicle is under the rinsing station while the rear of the vehicle is still under the first washing station and the middle of the vehicle is under the prerinsing station.

In order to further ensure that the rinse water is applied to the car substantially at atmospheric pressure, by which is meant that the water is not sprayed under pressure onto the car, a band or belt is provided on the filaments forming the rinsing curtain to hold them together at a location above the location at which the tallest vehicle that would be washed by the installation would engage this curtain. Such an arrangement makes vertically displacing the dispenser bar for the rinsing station largely unnecessary, although it still might be advantageous to provide vertical displacement means for this dispenser bar, coupled with sensor means for determining the height of the vehicle being rinsed.

SPECIFIC DESCRIPTION

Figure 1:
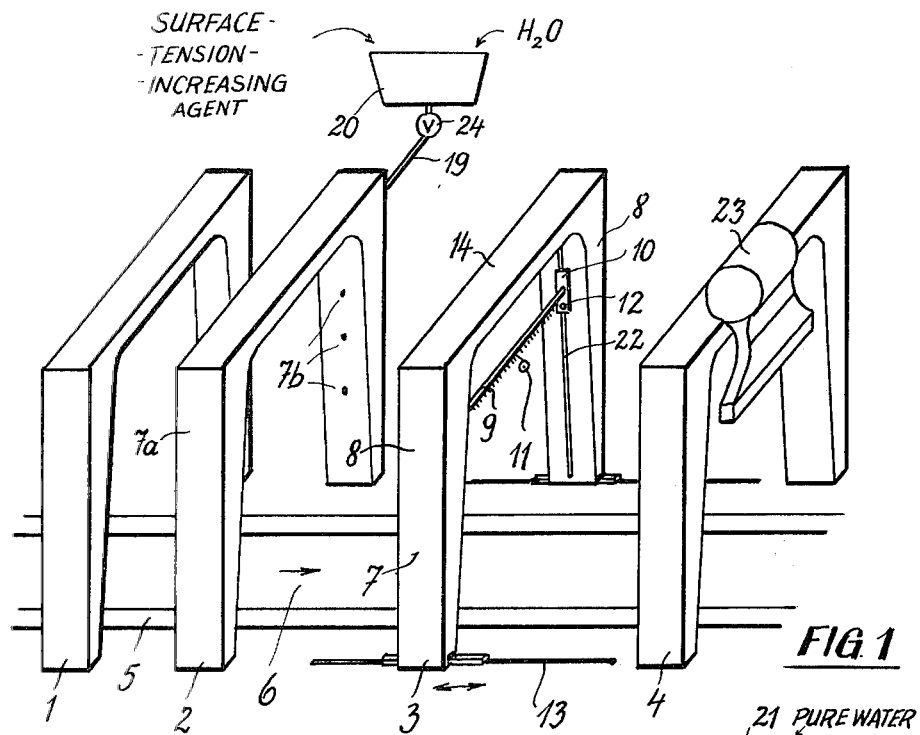
FIG. 1 is a perspective view of an installation according to this invention.

The installation in accordance with this invention, as shown in FIG. 1, has a pair pf tracks 5 along which a car or vehicle V (FIG. 2) is moved in a displacement direction 6 through an upstream washing station 1 where it is sprayed with hot soapy water and where it also may be subjected to mechanical brushing or the like, then through a prerinsing station 2, then through a final rinsing station 3, and finally through a drying station 4.

The prerinsing station 2 is formed as a portal 7a having nozzles 7b to which a solution of alcohol and water in concentration by weight of between 0.2%–0.4% of alcohol is supplied via a supply tube 19 connected via a valve 24 to a supply 20. The surface-tension-increasing agent in the prerinse water comprises by weight:

5%–15% dialkyldimethylammoniumchloride with between twelve and sixteen carbon atoms;
4%–10% of a mixture of primary, secondary, and tertiary amines with between six and twelve carbon atoms;
8%–20% solvent;
2%–5% defoaming oil; and
1%–5% scent.

This solution rinses off most of the soap or detergent from the car and leaves its surface 16 slightly hydrophobic.

Figure 2:
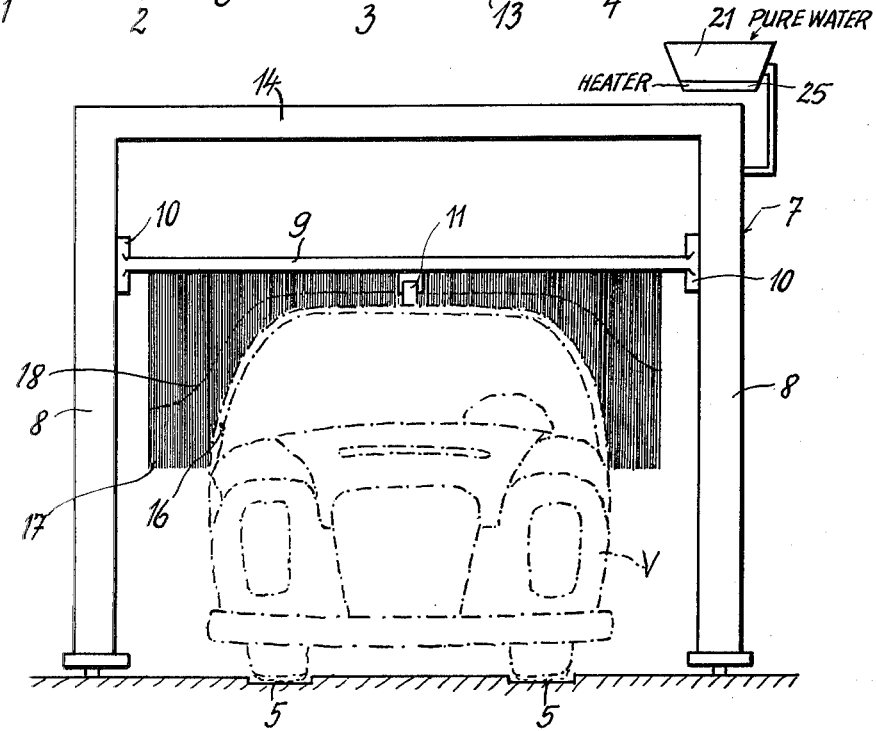
FIG. 2 is an end view partly in schematic form of the rinsing station of the car-washing installation of FIG. 1.

The rinsing station is formed as a portal 7, as also indicated in FIG. 2, having a pair of legs 8 and a cross member 14 and having a horizontal dispenser tube 9 supplied with substantially clean or pure water. This water is fed in from a reservoir 21 level with the tube 9 so that the liquid inside the tube 9 is substantially at atmospheric pressure. A heater 25 connected to the reservoir 21 raises the pure-water temperature to 50°–60° C.

Figure 3:
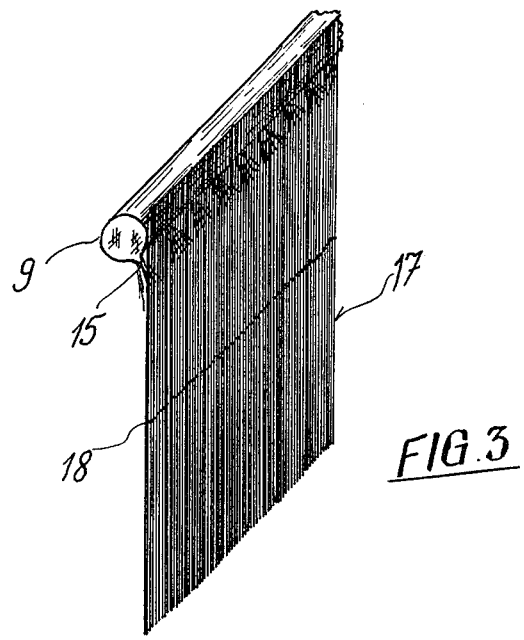
FIG. 3 is a large-scale partly sectional view of the rinsing curtain according to this invention.

This tube 9, as shown in FIG. 3, is provided with brush-type outlet openings 15 that engage adjacent the upper ends of vertical star-section filaments 17 (see FIG. 4A) that extend downwardly to form a curtain whose lower edge lies well below the upper surfaces 16 of the car V. A band or belt 18 may be secured to these filaments 17 to hold them together to ensure that the liquid flowing gently from the outlets 15 runs down as a continuous film or sheet and is thus applied to the car V.

In addition the tube 9 is provided at each end with a shoe 10 that rides vertically in a guide 22 of the respective leg 8. A roller-type sensor 11 and an electric-eye type sensor 12 may be used to vertically position the dispenser bar 9 so that it lies immediately above the upper surface of the vehicle V being rinsed at the station 7. Such a vertical positioning of the dispenser tube 9 ensures that the water dispensed from it is under minimal pressure.

Thus with the system according to the instant invention after the surface 16 of the car V has been rendered slightly hydrophobic by the aqueous solution used to rinse the car in the prerinsing station 2, a film of clean rinse water is applied to the car in the rinse station. This film will remove all remaining traces of soap or detergent and will itself run off the car in broad bands. The car is left substantially completely dry, so that a relatively small drying blower 23 in the drying station 4 will suffice to leave the car almost perfectly dry.

According to the instant invention the entire portal 7 of the rinsing station 3 is displaceable back and forth in the direction 6 in guides 13 in the floor. At the start of each rinsing cycle the entire portal 7 is positioned in the upstream ends of the guides 13. When a vehicle passes under it and the middle of the vehicle, which is normally its highest point, comes to a position underneath the dispensing bar 9, a valve in the feed line from the reservoir 21 is opened to form a film of water which runs down the curtain formed by the filaments 17 onto the car V. The entire portal 7 is then moved rapidly longitudinally forward in the direction 6 to the front of the vehicle and then very slowly backwardly against the direction 6, so as to spread the film of clean rinse water smoothly over the entire vehicle V. This action ensures meticulous rinsing of the vehicle, as the film will start at the highest point on the vehicle and move dowardly. In prior-art systems where the rinse water is applied from the front of the vehicle backwardly, it is fairly common for soapy water from the top of the vehicle to be washed forwardly down over previously rinsed portions, thereby completely countering the previous rinsing.

Figures 4A, 4B, 4C:
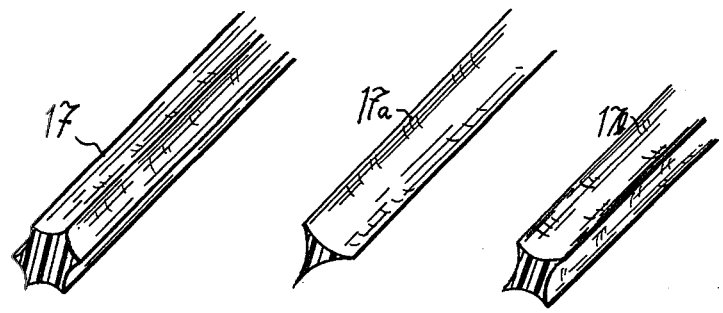
FIGS. 4A, 4B and 4C are end sectional views of filaments usable for forming the curtain of FIG. 3.

The filaments 17 as shown in FIG. 4A are of star section with concave outer sides. Instead of being six-sided, as shown in FIG. 4A, it is possible, as shown in FIG. 4B at filament 17A, to make them three-sided or as shown in FIG. 4C to make filaments 17b that are four-sided. The use of sharp edges along these filaments 17, which are formed of a limp synthetic resin, ensures that the water will run smoothly down and not form bubbles on the car V.

I claim:
1. In a method of cleaning a car wherein the car is treated with soapy water, the car is then prerinsed with water to remove most of the soapy water and then rinsed with clean water to wash off the remaining soapy water, and the clean water is dried and driven off the car by an air stream, the improvement comprising the steps of:

mixing the prerinse water prior to use with a surface-tension-increasing agent to render the surface of said car slightly hydrophobic; and pouring said rinse water from an overhead dispenser onto said car under substantially atmospheric pressure as a substantially continuous film, whereby said film runs off said car substantially without leaving drops behind said dispenser having a downwardly extending curtain formed from filaments, said rinse water being poured by flowing the rinse water down said curtain while maintaining the lower edge of said curtain in contact with the car being washed.

2. The improvement defined in claim 1, wherein said prerinse water is an aqueous alcohol solution in a concentration of between 0.2% and 0.5% by weight.

3. The improvement defined in claim 1 wherein said agent comprises by weight:
5%–15% dialkyldimethylammoniumchloride with between twelve and sixteen carbon atoms;
4%–10% of a mixture of primary, secondary and tertiary amines with between six and twelve carbon atoms;
8%–20% solvent;
2%–5% defoaming oil; and
1%–5% scent.

4. The improvement defined in claim 1, further comprising the step of heating said rinse water to between 50° C. and 60° C. prior to use.

5. The improvement defined in claim 1, wherein said method comprises the step of advancing said car longitudinally at an advance speed past said dispenser that pours said rinse water on said car, said improvement further comprising the steps of commencing to pour said rinse water on said car approximately when the middle of said car is underneath said dispenser, thereafter advancing the dispenser longitudinally forwardly over the moving car at a speed faster than said advance speed, and thereafter displacing said dispenser longitudinally backwardly over the moving car.

6. In a car-washing apparatus wherein a car to be washed is displaced longitudinally along a path at an advance speed past a washing station wherein it is treated with soapy water, then through a prerinsing station and then through a rinsing station wherein the soapy water is rinsed off the car with respective prerinse and rinse waters, and then through a drying station wherein water remaining on the car is dried from it, the improvement comprising:
a prerinse-water dispenser at said prerinsing station;
means connected to said prerinse dispenser for mixing a surface-tension-increasing agent with the prerinse water prior to use on the car;
a rinse-water dispenser at said rinsing station
said rinse-water dispenser having a downwardly hanging curtain, formed from filaments whose lower edge engages said car as the car passes under said dispenser; and means for pouring clean rinse water down said curtain substantially as a continuous film under atmospheric pressure to said car, whereby said film runs off said car substantially without leaving drops behind.

7. The improvement defined in claim 6 wherein said rinse-water dispenser is displaceable along said path, said improvement further comprising means for displacing said rinse-water dispenser along said path forwardly relative to the advance direction of said car at a rate faster than said advance speed.

8. The improvement defined in claim 6 wherein said rinse-water dispenser includes a feed conduit for said mixture and having outlet holes at the upper edge of said curtain.

9. The improvement defined in claim 6 wherein said curtain is formed of a multiplicity of limp and downwardly hanging filaments having lower ends constituting said lower edge.

10. The improvement defined in claim 9 wherein said filaments are of nonround section with sharp edges.

11. The improvement defined in claim 9 wherein said curtain includes a vertically displaceable band surrounding said filaments and holding same together substantially in line at an adjustable location above said lower ends.

12. The improvement defined in claim 6 wherein said rinse-water dispenser includes a brush at said upper ends of said filaments so said mixture can flow from said brush onto said filaments.

13. The improvement defined in claim 6 wherein said dispensers are portals over said path.

* * * * *